(No Model.) 2 Sheets—Sheet 2.
C. L. GOEHRING.
MACHINE FOR TURNING AND MOLDING WOOD.
No. 378,787. Patented Feb. 28, 1888.
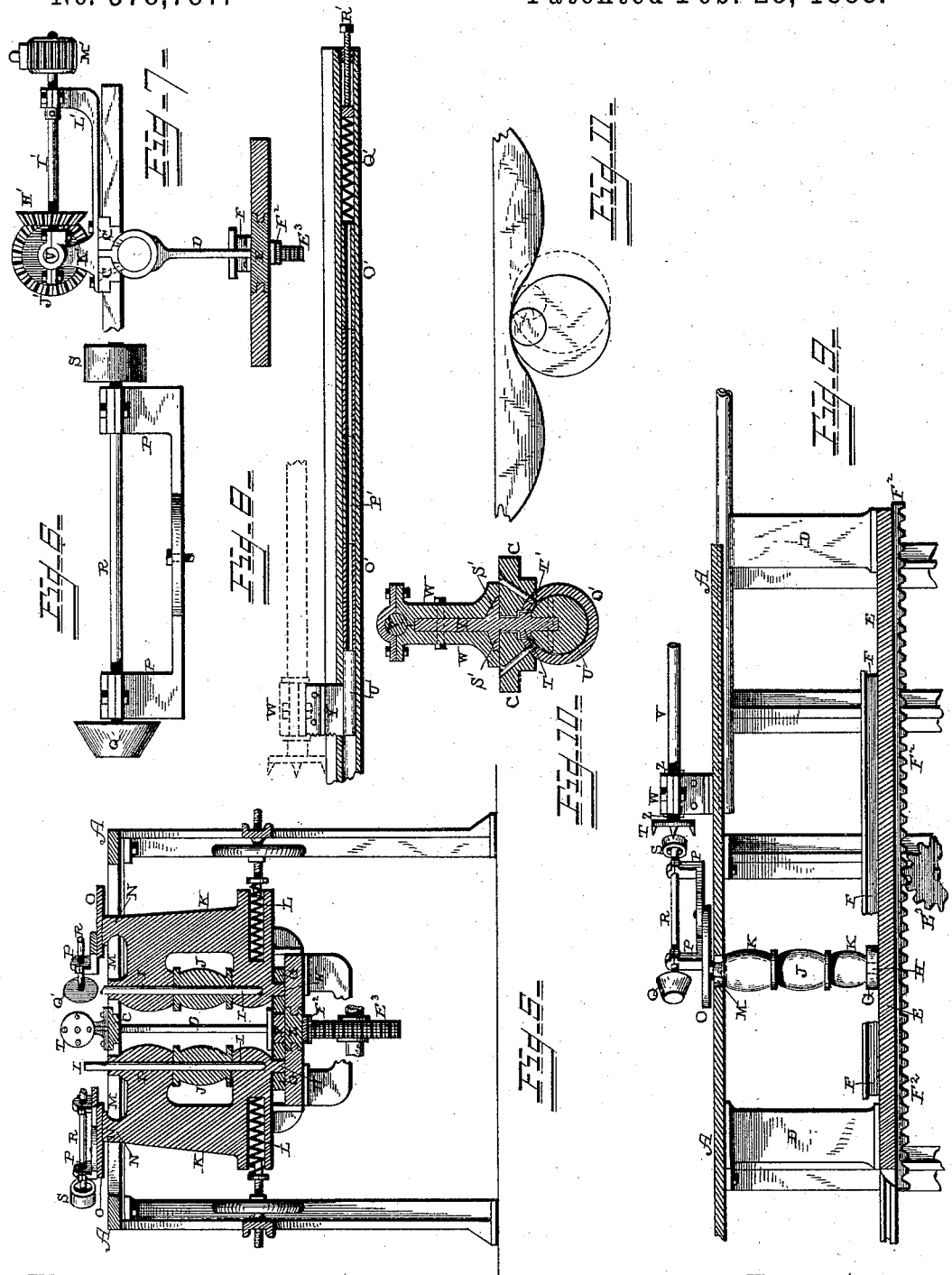

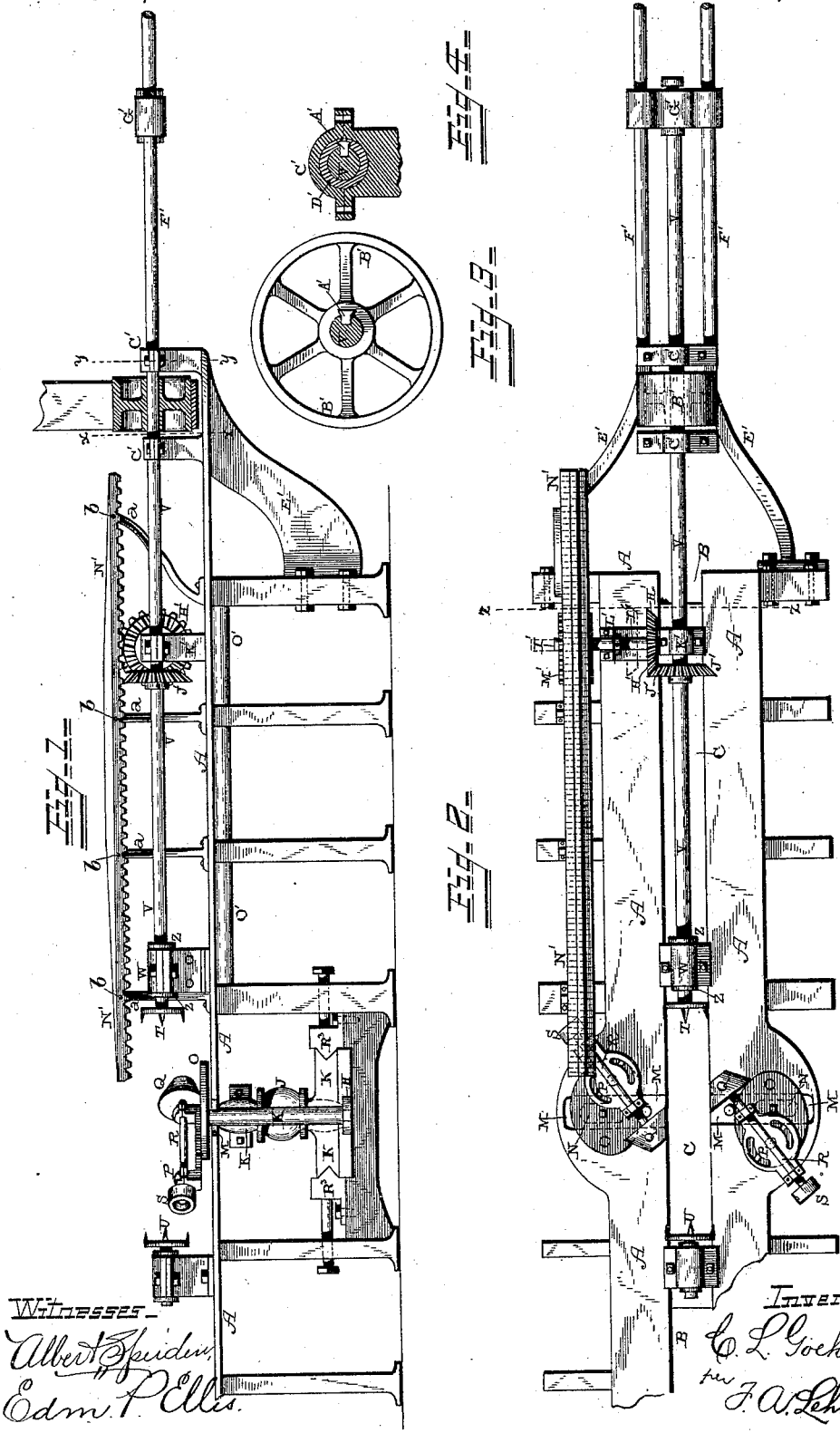

UNITED STATES PATENT OFFICE.

CHARLES L. GOEHRING, OF ALLEGHENY, PENNSYLVANIA.

MACHINE FOR TURNING AND MOLDING WOOD.

SPECIFICATION forming part of Letters Patent No. 378,787, dated February 28, 1888.

Application filed July 25, 1887. Serial No. 245,257. (No model.)

*To all whom it may concern:*

Be it known that I, CHARLES L. GOEHRING, of Allegheny, in the county of Allegheny and State of Pennsylvania, have invented certain new and useful Improvements in Machines for Turning and Molding Wood; and I do hereby declare the following to be a full, clear, and exact description of the invention, such as will enable others skilled in the art to which it pertains to make and use it, reference being had to the accompanying drawings, which form part of this specification.

My invention relates to an improvement in machines for turning and molding wood; and it consists in, first, the combination of one or more rotary cutters which are mounted upon spring-actuated carriages, so as to be laterally adjustable in relation to each other, an endwise-moving pattern placed between the carriages, and a rotary shaft for revolving the lumber while being acted upon by the cutters; second, the combination of a rotary cutter mounted upon a spring-actuated carriage, an endwise-moving pattern, and a slide for moving the pattern back and forth, with the sliding table, the dogs mounted upon the table, and a shaft which is carried back and forth by the table and causes the lumber to revolve while being acted upon by the cutters; third, the combination of the grooved revolving shaft, the driving-pulley provided with a spline and through which the shaft moves endwise, and the boxes provided with revolving collars, which are also provided with splines, so as to cause the collars to revolve in the boxes with the shaft; fourth, the combination of the shaft, which is carried back and forth by the table and which causes the lumber to revolve, a mechanism connected to the shaft, and also carried back and forth by the table, and a rack for imparting a slow motion to the shaft as the table is moved back and forth; fifth, the combination of the spring-actuated carriages, each one having a roller attached to its inner lower corner, a pattern for the rollers to bear against, and suitable cutters placed upon the tops of the carriages, all of which will be more fully described hereinafter.

The object of my invention is to produce a machine which will not only dress lumber to cylindrical forms, but which will rapidly carve the lumber into any desired shape or form that may be desired entirely by machinery, thereby greatly cheapening the cost, time, and labor of producing such work.

Figure 1 is a side elevation, partly in section, of a machine embodying my invention, the slide and the parts connected thereto being omitted for the sake of showing the feeding and cutting mechanism by themselves. Fig. 2 is a plan view of the same. Fig. 3 is a vertical section taken through on the line X X of Fig. 1. Fig. 4 is a vertical section taken through Fig. 1 on the line Y Y. Fig. 5 is a vertical section of a machine taken through the spindles. Fig. 6 is an enlarged detached view of one of the horizontal cutters. Fig. 7 is a vertical section taken on the line Z Z of Fig. 2, and showing the mechanism by which the endwise-moving shaft is given a slow motion. Fig. 8 is an enlarged vertical section of the movable dog which grasps the rear end of the timber. Fig. 9 is a side elevation, the slide and the pattern being shown. Fig. 10 is an enlarged view of the movable dog and the parts connected thereto. Fig. 11 is a diagram showing the effects produced in having the rollers and the cutters of different diameters.

A represents the frame or table, which has a longitudinal slot, B, through its center, and through which slot the table C is moved endwise, in order to carry the lumber that is being dressed in between the cutters. To the under side of this table are secured vertical hangers or supports D, and to the lower end of these hangers is secured the endwise-moving slide E. This slide is moved alternately first in one direction and then in the other by means of the pinion $E^3$, which meshes with the rack $F^2$ on the under side of the slide. This slide is moved back and forth for the purpose of operating the sliding table C, and thus carrying the rotating shaft V back and forth with it. This slide E and the table C being rigidly secured together by the hangers D, they both have the same movement. These parts are exactly the same as is shown in the patent granted to me April 26, 1887, No. 361,869, and hence need not be more fully described in this connection, with the exception that one of the hangers D is connected directly to the under side of the table and the other hanger is connected to the under side of the pipe, which acts as a guide for the movable dog.

The pattern F is placed directly upon the top of the slide E, and the two friction-rollers G, which bear against opposite sides of the pattern, are placed upon the lower ends of the bearings H, in which the spindles I, provided with the pulleys J, are journaled. Carriages K move horizontally back and forth between the ways R³, as shown in Fig. 1. These ways R³ are substantially the same as those shown in Patent No. 361,869. This pattern F is placed directly upon the slide E, in contradistinction to being raised above it, as shown in said Patent No. 361,869, so that the rollers G can be placed upon the lower end of the bearing H. By this construction the size of the rollers G can be varied according to the size of the cutter-heads—a thing which is not possible in the construction shown in said patent. Where the size of the rollers G remains the same and these rollers are of either greater or less diameter than the cutters, then the cutters cut away the wood at certain points before the roller operates upon the pattern sufficiently to cause a corresponding movement of the cutters. Where, however, the rollers and the cutters are of uniform diameter, they have a corresponding movement at all times, and the curved work produced by the machine always registers when brought together.

The differences in the movements of the roller and the cutter are illustrated in Fig. 11. The cutter is represented by the larger circle and the roller by the smaller one. The cutter being the largest cuts away the wood in advance of any movement of the carriage caused by the roller alone, and hence the cutter does not always follow the outline of the pattern for this reason. Where both roller and cutter are made of the same diameter the cutter follows the pattern under all circumstances. The bearings H form parts of the carriages K, by which the spindles are moved laterally in relation to each other, and which are held forced inward toward each other by means of the springs L. The inner upper corners of the carriages K pass through the transverse slots M, made in the top of the table, so as to keep the carriage in a vertical position and prevent any lateral motion.

Upon the upper outer corners of the carriages are formed the extensions N, which pass up through the slots a suitable distance above the top of the table A and receive the oval plates O, which support the frames P of the horizontal cutters Q. The shafts R, upon which the cutters are placed, extend horizontally through the bearings P, and receive the cutters Q upon one end and the driving-pulleys S upon the other. The plates O are rigidly secured to the upper outer corners of the carriages, and upon the tops of these plates O are pivoted the slotted bearings, P as shown. These bearings have curved slots for the purpose of allowing them to be turned upon the plates O, and thus turn the cutters Q at any desired angle to the piece of timber that is held between the two dogs T U. These cutters Q are placed one slightly in advance of the other, and are operated independently of each other. The one in advance roughs the piece of timber, while the one in the rear finishes the timber to any desired extent. The rotary dog T is secured upon the top of the sliding table C, and is moved back and forth with it. This dog T is secured to the front end of the endwise-moving shaft V, which is mounted in suitable boxes secured to the sliding table C and at any desired distance above the top of the table.

The front box, W, is bolted upon the top of the dog Y, and the shaft is prevented from moving endwise through the box W by a small collar, Z, which is placed upon the shaft at each end of the box. As the sliding table C is carried back and forth, the boxes which support the front end of the shaft are carried back and forth with the table, the boxes W K', in which the shaft V is journaled, being secured rigidly to the table C, so as to be carried back and forth by it, and the front end of the shaft V being prevented from any endwise movement through the box W by the collars Z, the shaft is carried back and forth with the table under all circumstances. The rotary movement imparted to this shaft V by the pulley B' does not in any manner affect the endwise movement of the shaft. The shaft may be made to continue to revolve when its endwise movement has been stopped for the time being, or the shaft may be moved back and forth by the table C without being made to revolve; but it is always necessary that the shaft should have both its endwise and rotary motion at the same time.

The shaft V is grooved its whole or nearly its entire length, and a corresponding spline, A', both in the boxes C' and the pulley B', is made to catch in this groove. The spline A' in the pulley B' serves simply to connect the pulley to the shaft for the purpose of causing the shaft to rapidly revolve and yet allow the shaft to move endwise through the pulley. In each of the boxes C', and surrounding the shaft V, is a revolving collar or sleeve, D', and in this collar D' is placed the spline A'. The collar D' revolves within the boxing C' with the shaft V, but the collars D', which are held stationary endwise in the boxing C', do not prevent the shaft V from having an endwise movement through them. These revolving collars D' serve to prevent the spline A' on the shaft V from cutting the boxes or journals, as would otherwise be the case if these collars were not provided for the purpose of protecting the boxes. The spline being made to catch in the collar, and the collar being made to revolve in the boxing, the spline is not allowed to come in contact with the boxing, as would otherwise be the case.

The boxing C' is formed upon the supports E', which are secured to the end of the framework of the table A, and extends upward in the manner shown in Fig. 1. Projecting horizontally from the support E' are the two supporting-rods F', upon which slides back and forth a support, G', in which the outer end of the shaft V is journaled. These rods or supports F' and the slide G' serve simply to support the end of the shaft rigidly in position. As the shaft V is moved endwise, the slide or support G' is carried back and forth with the shaft. A rapid rotary motion is given to the shaft D by means of the pulley B' as the shaft is carried back and forth by the sliding table C. The piece of lumber which is secured between the two dogs T U is given a correspondingly rapid revolving motion as it is passed through between the two cutters Q. While this shaft V is driven at a high rate of speed the lumber is dressed cylindrically, according to the pattern which is used.

When it is not desired that the shaft V shall have such a rapid motion, the belt is thrown off from the pulley B', and then the wheel H' on the shaft I', extending at an angle to the shaft V, is brought into gear with the wheel J', secured to the shaft V. These two wheels H' J' are only brought into gear when the shaft V is to have a slow movement. In throwing these wheels out of gear either the wheel J' may be moved back upon this shaft V or the shaft I' may be moved backward sufficiently far to throw the wheel H' out of gear. The shaft I' has its inner end journaled in the box K' and its outer end journaled in the arm or casting L', which extends outward over the top of the table and has a box formed in its outer end. Secured to the outer end of the shaft I' is the pinion M', which meshes with the rack N', secured upon suitable supports at a suitable distance above the top of the table. The supports $a$ for this rack N' are slotted, and the rack is made vertically adjustable thereon by means of the bolts $b$, which pass horizontally through the rack and through the slotted supports $a$, as shown in Fig. 1, for the purpose of adjusting the rack so as to correspond to the different-sized pinions which are used in connection with it. If a small one is to be used, the rack will have to be lowered, and if a large pinion, then the rack must be raised upward, because the shaft to which the pinion is secured has no vertical movement. This rack N', by meshing with the pinion M' as it is moved back and forth by the sliding table C, causes the wheels H' J' to give to the shaft V a slow rotary motion. The number of revolutions which this shaft V shall make in moving forward a certain distance is regulated by the size of the pinion M', placed upon the shaft I', or by varying the size of the gears H' J', as may be preferred. When screw-twist work is to be made, this slow-moving mechanism just described will be used, and the speed at which the shaft is made to revolve will then depend upon the amount of molding twist desired in the lumber within a given length of the lumber. While the slow-moving mechanism is being used for producing a molded twist the cutters will be moved laterally in relation to each other, according to the pattern used. Where two molding twists are to be given to the same piece of lumber, and each twist is to be given of a different form or shape from the other, the curves upon the opposite side of the pattern will be made to slightly precede each other, and in this manner the shape of the pattern will be varied according to the design which is to be worked upon the lumber by the cutters Q.

The lower portion of the dog Y extends down into the tube or pipe O', which extends along under the table, and in which pipe O' are placed short sections of pipe P', according to the distance the two dogs are to be separated from each other. This dog Y is held pressed forward by means of the short sections of the pipe P', placed in the pipe O', and by the spring Q' and set-screw R'. As shown in Fig. 10, upon opposite sides of this dog Y are formed the flanges S', which catch upon the top of the sliding table, and lower down are formed corresponding flanges, T', which catch against the under side of the sliding table C, and thus hold the dog Y rigidly in position. The cylindrical portion U', which moves in the pipe O', also serves to hold this dog rigidly in position. Upon the top of this dog Y is rigidly bolted the box W, through which the front end of the shaft V passes. This shaft is given a rapid rotary motion by means of the belt which passes around the pulley B', and is given an endwise movement back and forth by the slide C, upon which it is journaled. This shaft being given both a reciprocating and a rotary motion at the same time, the piece of lumber to be dressed is moved forward in between the two cutters Q, which are adjusted to any suitable angle in relation to the lumber, as shown in Fig. 2, and which are driven by separate and independent belts of their own. As the piece of lumber is moved in between the two cutters Q, the carriages K, carrying the cutters, adjust themselves laterally to the pattern F, which is placed between the rollers G upon the lower ends of the carriages. The cutters Q are placed one slightly in advance of the other, so that the one in advance roughs the lumber, while the one in the rear finishes it. When it is desired that the shaft V shall not have a rapid motion, the belt is removed from the wheel B', and then the wheel H' upon the shaft I' is made to gear with the wheel J' on the shaft V. As the shaft V is then moved back and forth by the table C, the wheel M' on the shaft I' meshes with the rack N'. The rack causes the wheel M' to revolve, and the revolution of this wheel is imparted to the shaft I', and by wheels H' J' to the shaft V. The carriages carrying the cutters Q being spring-actuated, they follow the outlines of the pattern F, and thus the cutters are made to give the piece of lumber being dressed the exact outline indicated by the pattern.

Having thus described my invention, I claim—

1. The combination of one or more spring-actuated laterally-moving carriages provided with cutters upon their upper ends, and an endwise-moving pattern which is placed between the carriages, with the endwise-moving sliding table, the dogs mounted upon the sliding table, and an endwise-moving revolving shaft carrying one of the dogs, whereby the lumber is given a rotary and endwise movement as it is being acted upon by the cutter or cutters, substantially as shown.

2. The combination of a rotary cutter placed upon the top of the table, a spring-actuated carriage for moving the cutter laterally in relation to the piece of lumber being dressed, a pattern, and a slide for moving the pattern back and forth, with the sliding table, two dogs between which the lumber is held, and a shaft which causes the lumber to revolve, and which shaft is carried back and forth by the table in its movements, substantially as described.

3. The combination of the laterally-adjustable cutter or cutters, the endwise-moving table, the dogs secured to the table and carried back and forth, thereby, the grooved revolving shaft journaled by means of suitable boxes upon the sliding table, the boxes C', through which the shaft passes, and the pulley B', the boxes and pulley being provided with a spline, A', substantially as set forth.

4. The combination of the boxes C', the revolving collars D', placed inside of the boxes and provided with a spline, A', and the endwise-moving shaft V, substantially as specified.

5. The combination of the endwise-moving table C, the boxes mounted thereon, the shaft V, passing through the boxes and provided with a dog at one end, and a mechanism, substantially as described, for causing the shaft to move at a slow rate of speed as it is carried back and forth by the table C, substantially as shown.

6. The combination of the shaft V, the endwise-moving table journaled in suitable boxes, secured to the endwise-moving table C, and provided with a wheel, J', the shaft I', placed at an angle to the shaft V and provided with a gear, H', and a pinion, M', and the stationary rack with which the pinion meshes, substantially as described.

7. The combination of the spring-actuated carriage or carriages, the endwise-moving slide, the pattern, the slotted table, a friction-roller for each carriage to bear against the pattern, a projection upon the upper end of the carriage to extend through a suitable slot in the table A, a horizontal supporting-plate connected to the carriage, and an adjustable horizontal pivoted cutter mounted upon the support, substantially as specified.

8. The combination of a spring-actuated carriage or carriages provided with bearings upon their inner lower corners, the friction-roller for each carriage and which is applied to the bearing, the endwise-moving pattern which is placed between said rollers, and the endwise-moving slide which supports the pattern, with the slotted table, the endwise-moving table C, and the dogs between which the lumber is supported, the rotary endwise-moving shaft which is carried back and forth by the table C, and which has one of the dogs secured to it, and the cutters for acting upon the lumber placed upon opposite sides of the table C, substantially as shown.

9. The combination of the table A, having a slot through its top, the endwise-moving table C, placed in the slot, a mechanism for moving the table, the shaft V, for causing the lumber to revolve, and the horizontal cutters placed at an angle to the timber which is being operated upon, one of the cutters being placed slightly in advance of the other and each cutter being placed upon a spring-actuated carriage, so as to be laterally removable in relation to the lumber, substantially as described.

In testimony whereof I affix my signature in presence of two witnesses.

C. L. GOEHRING.

Witnesses:
F. A. LEHMANN,
EDM. P. ELLIS.